Sept. 3, 1935.    H. E. IVES    2,012,995

STEREOSCOPIC MOTION PICTURE

Original Filed Feb. 9, 1929    4 Sheets-Sheet 1

INVENTOR
H. E. IVES
BY
ATTORNEY

Sept. 3, 1935.  H. E. IVES  2,012,995
STEREOSCOPIC MOTION PICTURE
Original Filed Feb. 9, 1929  4 Sheets-Sheet 2
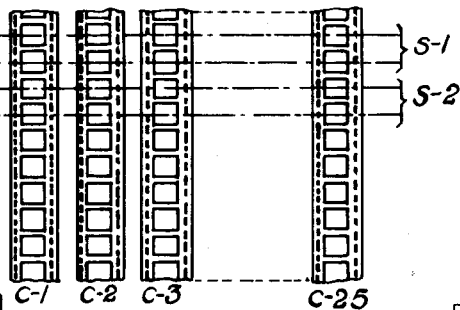
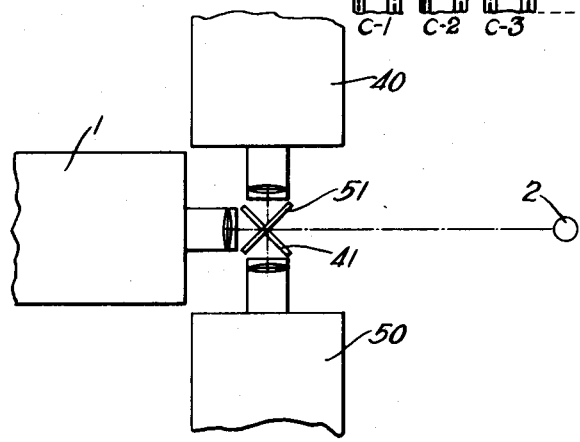
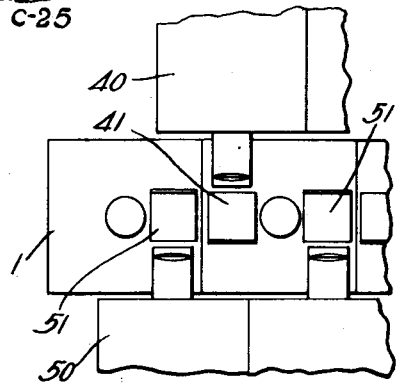
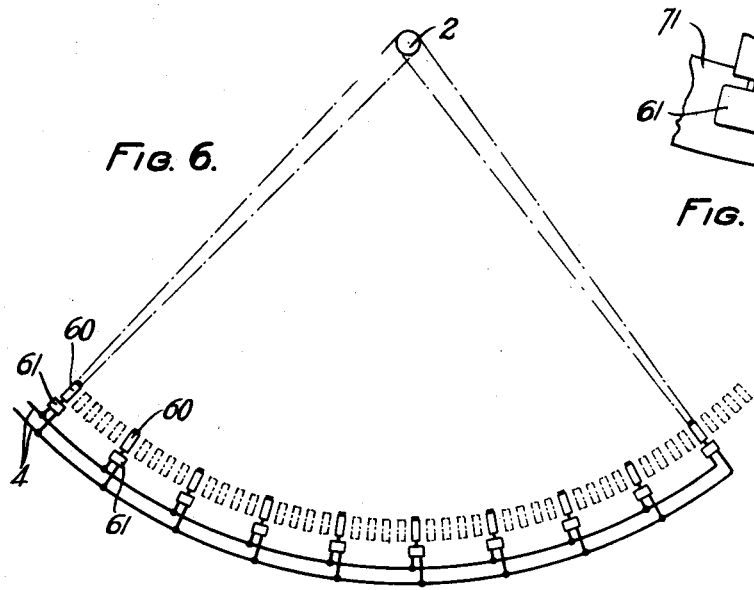
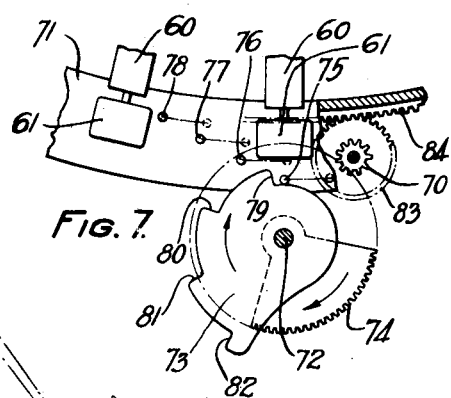
INVENTOR
H. E. IVES
BY
Otis Sprague
ATTORNEY Sept. 3, 1935.  H. E. IVES  2,012,995
STEREOSCOPIC MOTION PICTURE
Original Filed Feb. 9, 1929  4 Sheets-Sheet 3
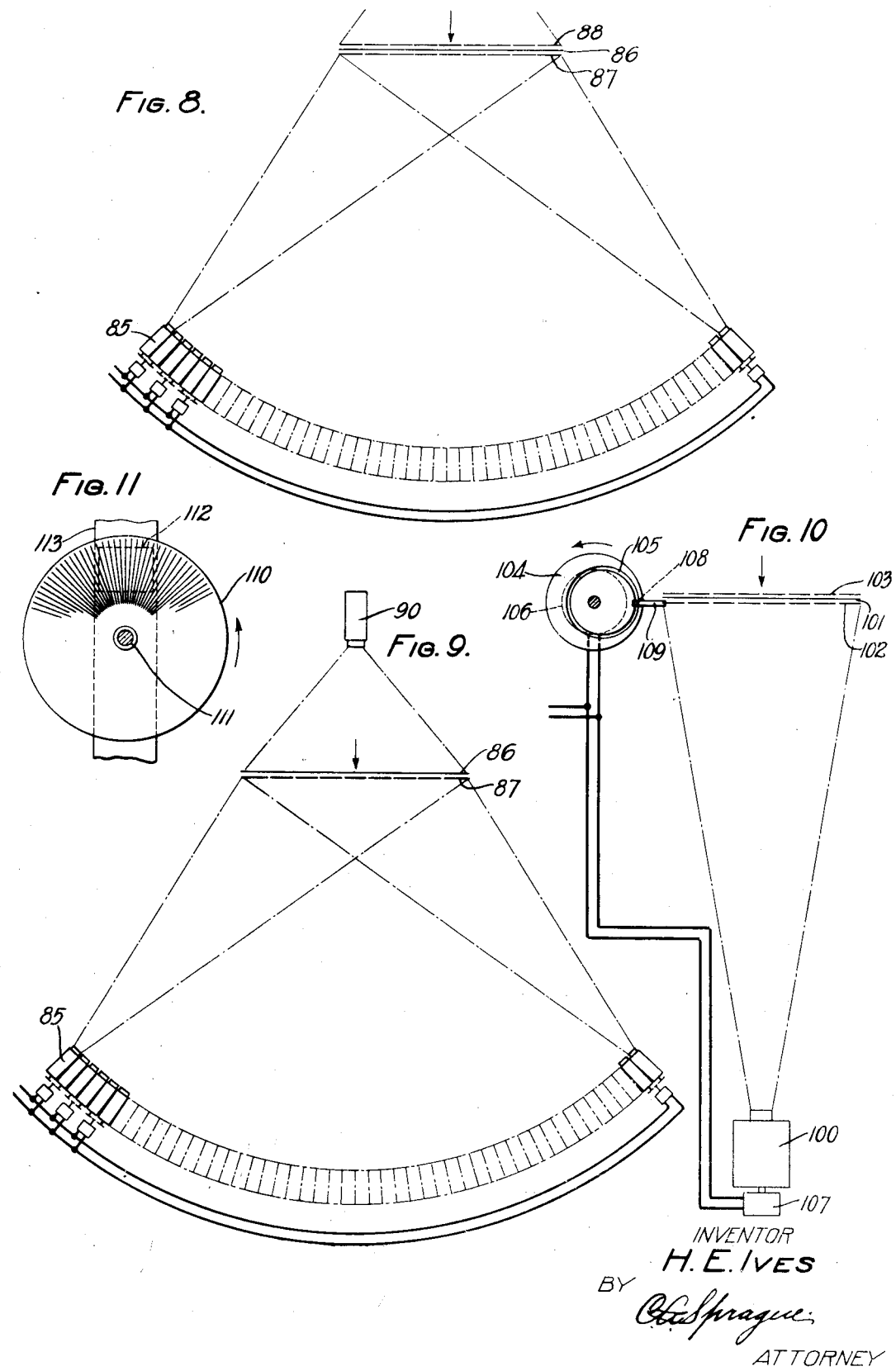
INVENTOR
H. E. IVES
BY
ATTORNEY Sept. 3, 1935. H. E. IVES 2,012,995
STEREOSCOPIC MOTION PICTURE
Original Filed Feb. 9, 1929  4 Sheets-Sheet 4

INVENTOR
H. E. IVES
BY
ATTORNEY

Patented Sept. 3, 1935

2,012,995

UNITED STATES PATENT OFFICE 2,012,995

STEREOSCOPIC MOTION PICTURE

Herbert E. Ives, Montclair, N. J., assignor to Bell Telephone Laboratories, Incorporated, New York, N. Y., a corporation of New York Application February 9, 1929, Serial No. 338,642
Renewed January 22, 1935

16 Claims. (Cl. 88—16.6)

This invention relates to the producing of pictures in stereoscopic relief and more particularly to stereoscopic motion pictures.

An object of the invention is to obtain and project stereoscopic motion pictures in such a manner that the stereoscopic effect is present when the projected pictures are viewed from different angles and different distances without the use of any instrument at the observer's eyes.

A number of methods for projecting motion pictures in stereoscopic relief have been proposed, many of which involve the use of some special viewing device at the observer's face. Among these may be mentioned the anaglyph, or two color arrangement, which demands a pair of special colored glass spectacles; the polarization method in which the two images are polarized in different planes, and are viewed through analyzing prisms, one over each eye; and the method in which the two images are projected alternately and are viewed through a sectored disc which exposes each eye in turn.

In accordance with the present invention the principle of the "Parallax panoramagram" is applied to motion pictures. The term parallax panoramagram is used to characterize a type of transparency stereoscopic picture invented by C. W. Kanolt and disclosed in his Patent No. 1,260,682 granted March 26, 1918. The parallax panoramagram is somewhat related to the parallax stereogram invented by Frederic E. Ives and disclosed in his U. S. Patent No. 725,567 which issued in 1903. In the parallax stereogram two component pictures were present as alternating fine strips, each series of strips visible to a single eye through a grating standing at an appropriate distance in front of the picture which had to be viewed at a definite distance and angle to obtain the stereoscopic effect. In the parallax panoramagram there is an infinite series of strips, or a panorama, behind each clear grating space, in place of the two pictures behind each clear grating space in the parallax stereogram. As the parallax panoramagram transparency, with its attached grating, is viewed from different angles by a single eye, the picture seen through the grating spaces changes continuously in the same manner that the original photographed scene changes when similarly viewed. Viewed by both eyes a panoramagram presents stereoscopic relief, at all distances and at any angle. The panoramagram picture is taken with a camera which moves through an infinite number of positions during the exposure and the sensitive surface is exposed through a grating made up of a large number of alternate opaque and transparent vertical strips. The width of a transparent portion is much less than that of an opaque portion, the ratio being, for example, one to ten. The method of taking a panoramagram involves changing during actual exposure, the relative position of the lens of the camera, the sensitized surface and the grating. Pictures of this sort are viewed through a grating similar to that used in taking the picture, which is placed close to the picture. Under any given relation of picture, grating and one eye of an observer, one narrow line of each field behind each clear grating space is visible, the rest being hidden, and these lines together form the view at that particular angle of observation. As the relative position changes, another set of lines, and therefore another view, is seen. Consequently an observer looking with both eyes sees two views and so obtains the stereoscopic effect. The present invention permits the effects of the parallax panoramagram to be obtained with moving pictures.

In the following specification a number of arrangements for taking and projecting motion pictures having the characteristics of the parallax panoramagram are described. In one such arrangement which may be here mentioned by way of example, a large number of separate motion picture cameras, for example 50, are set up side by side and all directed to the same object. These cameras are very narrow so that the lenses are in practical juxtaposed position. A complete series of views of the object from all necessary directions is thus taken and form a record of the moving object in the form of a large number of motion picture films. To project from this record there may be set up in place of the original cameras a corresponding number of motion picture projectors, all directed toward the same translucent screen, which is viewed from the side opposite the projectors. A short distance behind the screen and between it and the projectors is placed an opaque line grating of the parallax panoramagram type, by virtue of which the screen picture produced by each projector is cut up into narrow adjacent strips. Near the screen and between it and the observer is placed a second similar grating, through which the observer sees the picture in relief. In order to avoid the use of a large number of projectors in the projecting room of a motion picture theatre these may be located elsewhere and a separate motion picture may be taken from the position of the observer of the screen but with the grating on that side of the screen removed. The resulting film may then be used to project from a single projector.

The invention will now be described with reference to the accompanying drawings, in which Fig. 1 is a diagrammatic showing of one arrangement for taking the pictures;

Figs. 4 and 5 are diagrammatic showings respectively, of front and side views of tiers of cameras used in a modified arrangement for taking the picture;

Fig. 6 is a diagrammatic showing of a further modification of the taking apparatus;

Fig. 7 is a fragmentary showing of a detail of the apparatus of Fig. 6;

Fig. 8 is a diagrammatic showing of one form of projecting apparatus;

Fig. 9 is a diagrammatic showing of a modified form of projecting apparatus;

Fig. 10 is a diagrammatic showing of another modified form of projecting apparatus;

Fig. 11 is a detail view of a grating which may be used in a projector in accordance with the invention;

Fig. 17 illustrates a form of stereoscopic motion picture record in accordance with this invention.

Figure 1:
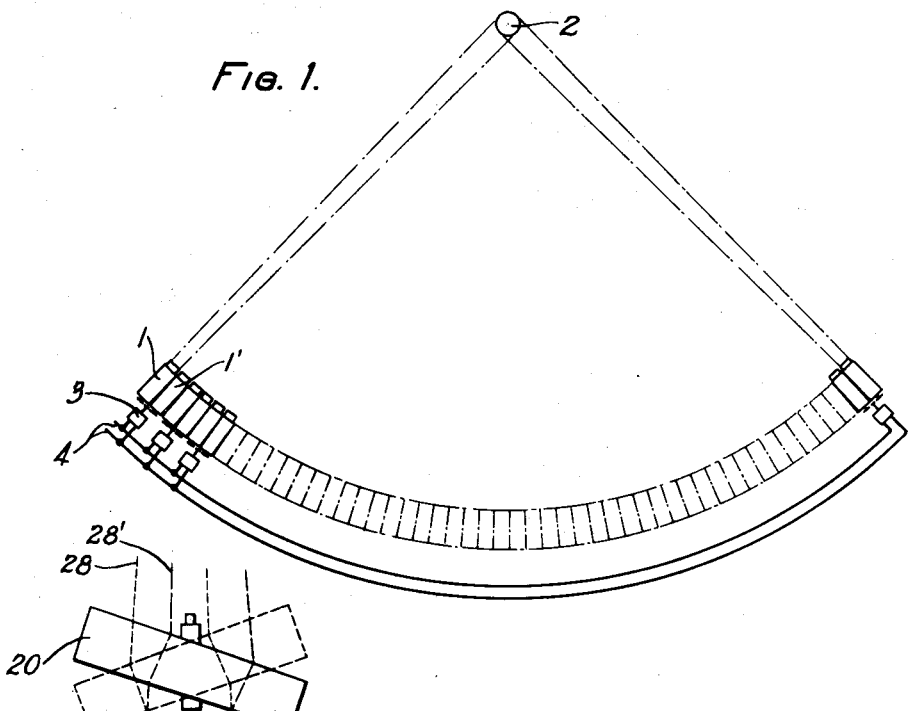

Referring to Fig. 1, a series of motion picture cameras 1, 1' are arranged in the arc of a circle at the center of which the object 2 which is to be photographed is placed. In this figure fifty cameras are shown, but this number is chosen as being merely representative. These cameras are of the type ordinarily employed in taking motion pictures but are preferably much narrower so that the diameter of the camera lens is nearly as great as the width of the camera. The films of these cameras may be driven by any suitable means such that they are operated synchronously. As shown motor 3 drives the first pair of cameras 1 and 1' and the succeeding pairs are driven by similar motors. These motors are all energized from the same source of alternating current supplied to the line 4. It will be seen that when these cameras are in operation each will produce a series of exposures each of which series will show the field from a different point of view.

Figure 2:
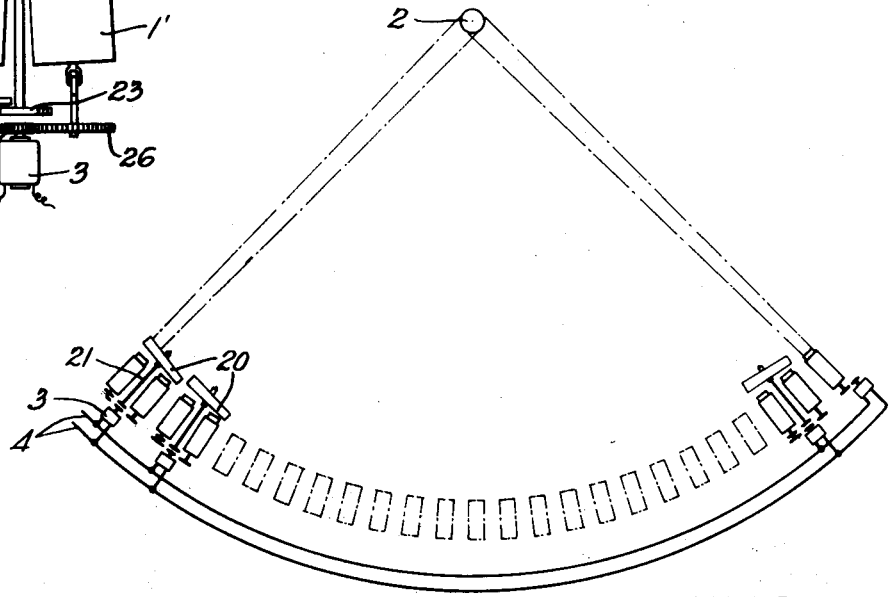
Fig. 2 is a diagrammatic view of a modification of the picture taking apparatus.

To obtain the same general result with half the number of cameras the arrangement shown in Fig. 2 may be employed. Here the cameras are spaced apart by the width of a camera and each pair is provided with a rotating sheet of plate glass 20, which rotates upon a shaft 21 (Fig. 3) driven by the motor 3 through the intermittent gear arrangement 22, 23. Motor 3 directly drives gear 24 which meshes with gears 25 and 26 which drive respectively the film feeding mechanisms of cameras 1 and 1'. Pin 27 engages intermittently with the series of teeth of gear 23. An exposure is thus made by each of the cameras 1 and 1' when plate 20 is in the position shown in solid lines and plate 20 is then moved into the position shown in broken lines and remains there while a second exposure is made in each of the cameras and this action is repeated for succeeding exposures. When element 20 is in the position shown in solid lines the axis 28 of the effective beam of light from the object is to the left of the center of camera 1 and when element 20 is in the position shown in broken lines axis 28' of the effective beam is to the right of the center of the camera. The result is that alternate frames of the picture taken by camera 1 show the object from different positions. Element 20 likewise shifts the axis of the effective beam of camera 1' alternately to the right and left of the center of that camera, with the same result. Element 20 is made slightly wedge shaped to compensate for the cameras being arranged in the arc of a circle.

Figure 3:
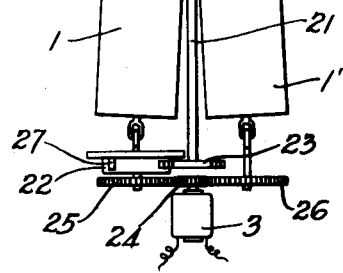
Fig. 3 is a detailed view of the apparatus shown in Fig. 2.

The form of record obtained with the arrangement of Figs. 2 and 3 is illustrated in Fig. 17. A plurality of strip records C—1, C—2, C—3 to C—25 are produced, one strip for each camera. The frames on these strips form sets of views S—1, S—2, etc. each view in each set representing the aspect of the field at a later time than the corresponding view in the preceding set. The upper row of frames of each set is produced with the elements 20 in one position while the lower row is produced with the elements 20 in their alternate positions.

If it is desired to take views from a larger number of positions than can be obtained with the arrangement shown in Figs. 1 and 2, several tiers of cameras may be employed as shown in Figs. 4 and 5. One tier of cameras is arranged in a horizontal position while two other tiers are arranged in a vertical position, one below the first tier and pointing upward and the other above the first tier and pointing downward. each of the tiers of cameras 40 pointing downward receives light from the object 2 by virtue of a mirror 41. Likewise the lower tier of cameras 50 receives light reflected from the object by mirrors 51. In this arrangement each camera may be considerably wider than the diameter of its lens.

There is shown in Fig. 6 an arrangement similar to that shown in Fig. 1, but instead of the fifty cameras shown in Fig. 1, ten cameras 60 are employed and each of these cameras is stepped into four additional positions by mechanism shown in Fig. 7. Cameras 60 are attached to a common driving member 61. Shaft 72 is continuously driven by a motor (not shown). Cam 73 and gear segment 74 are rigidly attached to shaft 72. As the cam 73 revolves pins 75 to 78 are engaged in succession by cam surfaces 79 to 82 respectively and are moved thereby into the positions shown in broken lines, which causes element 71 to be stepped intermittently to the right. When pin 78 rides off cam surface 82 gear segment 74 engages gear 70 which is rigidly attached to and concentric with pinion 83 which in turn engages rack 84. This returns element 71 to its initial position in a period equal to that required for a small step in the reverse direction. The motor which drives shaft 72 is supplied with current over line 4 in such a manner that the movements of element 71 take place between exposures. The speed of operation is such that five exposures are made by each camera in five different positions respectively during the period ordinarily required for taking a single frame of motion pictures. Each camera film therefore has upon it sets of views of five views each taken at different angles respectively.

In Fig. 8 there is shown an arrangement for projecting from the films taken by the cameras of Fig. 1. Fifty projectors 85 are driven by motors as in Fig. 1 and each is directed to the translucent motion picture screen 86. A parallax panoramagram grating 87 made up of alternate transparent and opaque vertical lines is placed next to the screen on the side toward the projectors. As in an ordinary parallax panoramagram the opaque lines are much wider than the transparent lines; for example, ten times as wide. For the sake of clearness a much smaller number of these pairs of lines is shown in the drawing than is actually employed. The picture projected upon screen 86 from the projector 85 at the extreme left is made up of a large number of narrow parallel vertical strips produced by light passing through the transparent portions of the grating. Likewise the projected picture from each of the other projectors is made up of a similar series of strips occupying slightly different positions. The screen is viewed from the side opposite the projectors in the direction shown by the arrow and the observers see the picture through a second parallax panoramagram grating 88 similar to grating 87. Each observer therefore sees with one eye only that portion of the composite picture on the screen which is projected by one of the projectors 85 and with the other eye the picture projected by the adjacent or a nearby projector. Since these two pictures have been taken from slightly different angles a stereoscopic effect is produced.

Each of the projectors shown in Fig. 8 may be similar to the ordinary picture projection machine but is preferably not so wide.

The arrangement of projection machines shown in Fig. 8 may be modified in an obvious manner to project from films taken with the cameras arranged as shown in Figs. 2, 4, and 6. In each instance the projectors occupy the same positions relative to each other that the cameras occupy when the pictures are taken.

The necessity of using a large number of projectors every time the pictures are to be viewed may be avoided by the arrangement shown in Fig. 9. The projectors 85, screen 86 and grating 87 are arranged as in Fig. 8; but screen 88 is omitted and a motion picture camera 90 is used to photograph the screen, receiving upon each frame of its film the composite picture composed of the several pictures taken at slightly different angles in the original photographic operation. The film thus obtained is similar in structure to the positive used in the parallax panoramagram. This film is then projected from an ordinary projector upon a translucent screen which is provided with a parallax panoramagram grating on the viewing side. It is necessary to have the grating lines in proper registration with the strips of picture on the screen. The accurate registration of the image with the grating line is difficult to accomplish. However, small, slow departures from the proper registrations have the effect of slowly shifting the observer's position which is not a serious defect since a shift of this nature is sometimes purposely introduced in taking motion pictures to give the illusion of relief.

Instead of employing camera 90 the same result may be accomplished by using a set of long-focused projectors each of which projects an image of ordinary film frame size upon an ordinary motion picture film placed in the position of the screen 86 and which is moved in the usual manner at an appropriate speed.

Another arrangement of projecting apparatus in which a single projector is employed is shown in Fig. 10. A large number of motion picture images which are taken by simultaneous exposures in a group of cameras are copied upon a single film by any appropriate copying apparatus (not shown) in such a manner that the images are printed in series along a single film so that they may be projected in rapid succession. For example, the films obtained by the arrangement shown in Fig. 1 would be copied onto a single film so that the views taken simultaneously by all of the cameras forming one complete set or frame would appear in succession in a plurality of series on the film. This film is now projected upon screen 101 by an ordinary projector 100. Since it is necessary to project fifty views within the period of one ordinary motion picture film a rapid projection mechanism is used like that employed in superspeed motion picture cameras used for producing slow motion pictures. In this arrangement it is necessary to provide means whereby each image projected is seen only in its appropriate direction by an observer viewing the screen in the direction of the arrow through the parallax panoramagram grating 103. For this purpose the grating 102 which is similar to the gratings disclosed in the arrangements of Figs. 8 and 9, is caused to oscillate so that during the period of each ordinary motion picture frame (about 1/20 of a second), the clear spaces of the grating move progressively through a series of positions corresponding to the points of view of the taking cameras. This motion of the grating takes place in proper time relation to the projection of the series of motion picture elements so that each motion picture view will occupy its proper position on the screen. The mechanism shown for oscillating the grating 102 is a rotating disc 104 containing a cam groove 105. The disc is continuously rotated in the direction of the arrow by motor 106 energized by alternating current from the same source as motor 107 which operates the projector 100. Pin 108 attached to a projecting arm 109 on grating 102 rests in the channel 105. The relative size of elements 105 and 101 as shown in Fig. 10 is not that which would be used in practice. Screen 101 and the gratings used with it are of large size and the movement of grating 102 is of course very small, so that movement of pin 108 is small. Since the grating 102 has considerable mass it would be of advantage to replace it with a smaller screen nearer the projector. A suitable position for the grating is close to the film in the projector. A form of grating which may be used in this position is shown in Fig. 11 which is a view within the projector, arranged as in Fig. 10, looking toward the screen. The grating is in the form of a transparent screen 110 upon which opaque radial lines are ruled. This disc is continuously rotated in the direction of the arrow upon the shaft 111 by gears (not shown) or other appropriate means driven by motor 107. Grating 110 performs the same function as grating 102 of Fig. 10 but instead of oscillating is continuously moved across the projector opening 112 past which film 113 is moved. Assuming, for example, that there are 1000 lines per inch across the upper edge of the opening 112 the peripheral speed of the circular grating would be 1/1000 of an inch in 1/20 of a second or 1/50 of an inch per second. When a grating of this type is employed the lines of grating 103 must likewise be radially arranged and spaced to conform to the projection of the lines of grating 110 upon the screen 101. Or grating 102 can be reduced in size without modifying its shape and moved up to or within the projector. It can then be oscillated by a disc similar to disc 104, but reduced in size, or by other suitable mechanism.

Figure 12:
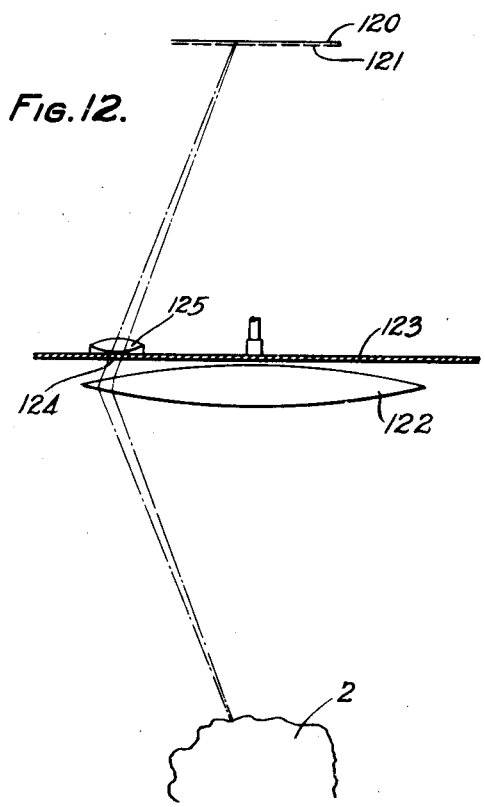
Fig. 12 shows diagrammatically a further modification for taking pictures in accordance with the invention.

Fig. 12 shows a modified arrangement for taking motion pictures in accordance with the invention in which the record consists of a single film 120 of the parallax panoramagram type. Adjacent the film is placed a parallax panoramagram grating 121. An image of the object 2 is formed upon the film 120. Adjacent cylindrical lens 122 is the disc 123, a fragment of which is shown in elevation in Fig. 13. This disc has a slot 124 which, when the disc rotates in the direction of the arrow, sweeps across the lens from left to right. Slot 124 is covered by lens 125, which focuses an image of the object upon the film 120, with the help of cylindrical lens 122, which acts as a prism of constantly changing angle. Each position of the slot therefore produces a series of line exposures each of which is slightly displaced from the preceding one, thus producing a parallax panoramagram type of exposure. As the slot 124 passes out of alignment with the lens at its right end, a second similar slot in the disc 123 may just be coming into alignment with the lens at its left end. Each frame of the record has its upper and lower edges in the form of arcs of a large circle. Only the central portion of the disc 123 is shown in Fig. 12. This disc must, of course, be of large diameter. Lens 125 may be omitted and lens 122 formed to perform the functions of both lenses in Fig. 12.

Figure 15:
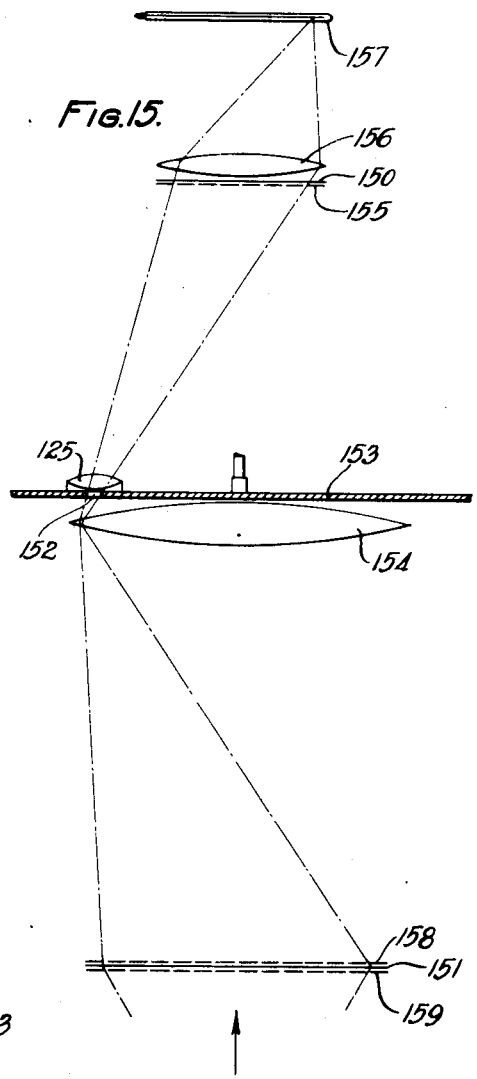
Fig. 15 is a diagrammatic showing of a projecting apparatus for use with the picture taken with the apparatus of Fig. 12.
Figure 13:
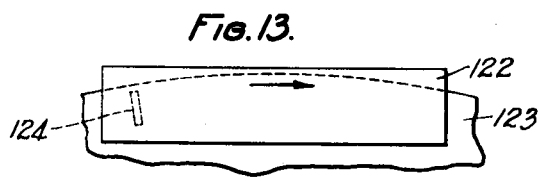
Fig. 13 is a view in elevation of a portion of the apparatus shown in Fig. 12.

The film obtained by the picture taking apparatus shown in Figs. 12 and 13 may be projected by means of the apparatus shown in Fig. 15. The record 150 obtained from the film 120 in the usual manner is projected upon the screen 151 through slot 152 in disc 153, corresponding to disc 123 of Figs. 12 and 13. Lens 154 is similar to lens 122 and grating 155 is similar to grating 121. A condensing lens 156 concentrates light from the lamp 157, which constitutes a line source of light, upon the record 150. A different point of light in this line source is utilized for each position of the slot 152. A parallax panoramagram grating 158 is placed near the screen 151. Another parallax panoramagram grating 159 is placed near to and on the other side of the screen, which is viewed through the latter grating.

Figure 14:
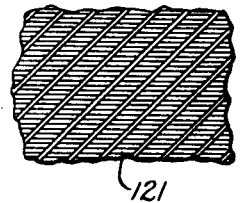
Fig. 14 is a detailed fragmentary view of the grating shown in Fig. 12.
Figure 16:
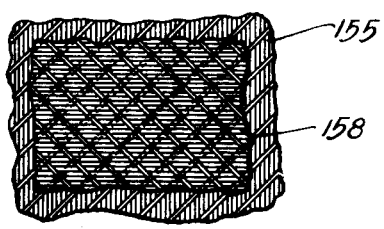
Fig. 16 is a detailed fragmentary showing of gratings employed in the projecting apparatus of Fig. 15.

Gratings 121, 155, 158 and 159 may, if desired, have their lines substantially vertical. However, it is sometimes difficult to keep these gratings in exact optical alignment, which results in the formation of interference bands across the picture. This may be prevented by having gratings 121 and 155 ruled diagonally in one direction and gratings 158 and 159 ruled in a direction at 90° to the ruling of the other gratings. The picture is thus made up of a series of spots produced at the intersection by the transparent lines of the the two sets of gratings. These forms of gratings are illustrated in Figs. 14 and 15.

Various details of technique in producing moving pictures of the parallax panoramagram type are similar to those used for the parallax stereogram and the ordinary parallax panoramagram.

What is claimed is:

1. Apparatus for producing a stereoscopic pictorial record comprising a large number of cameras directed to the same portion of the same field of view, means for causing repeated exposures to be made by said cameras at the same rate, and movable light-directing means for producing the effect of relative change of position between said cameras and said field between exposures.

2. In apparatus for producing motion pictures in relief, means for producing a record in the form of a series of sets of views of a field of view, each view of a set when viewed in the normal manner of viewing photographs showing an aspect of the field of view, each view of each set showing the aspect of the field at a later time than the corresponding view of the preceding set and each set comprising a large number of views from different points of view respectively, and means comprising a grating for producing from said record an image visible in stereoscopic relief from any position within a viewing space corresponding to said different point of view.

3. In apparatus for producing motion pictures in relief, means for producing a record in the form of a series of sets of views of a field of view, each view of a set when viewed in the normal manner of viewing photographs showing an aspect of the field of view, each view of each set showing the aspect of the field at a later time than the corresponding view of the preceding set and each set comprising a large number of views from different points of view respectively, and means for producing from said record an image visible in stereoscopic relief from any position within a viewing space corresponding to said different points of view, said means comprising a grating consisting of alternate transparent and opaque lines.

4. In apparatus for producing motion pictures in relief, means for producing a record in the form of a series of sets of views of a field of view, each view of a set when viewed in the normal manner of viewing photographs showing an aspect of the field of view, each view of each set showing the aspect of the field at a later time than the corresponding view of the preceding set and each set comprising a large number of views from different points of view respectively, and means for producing from said record an image visible in stereoscopic relief from any position within a viewing space corresponding to said different points of view, said last means comprising means to make visible only such portions of said record at a given viewing position as to produce the relief effect.

5. In apparatus for producing motion pictures in relief, means for producing a record in the form of a series of sets of views of a field of view, each view of a set when viewed in the normal manner of viewing photographs showing an aspect of the field of view, each view of each set showing the aspect of the field at a later time than the corresponding view of the preceding set and each set comprising a large number of views from different points of view respectively, and means for producing from said record an image visible in stereoscopic relief from any position within a viewing space corresponding to said different points of view, said last means comprising light controlling means to render effective different portions of each set of views dependent upon the direction of viewing.

6. In apparatus for producing motion pictures in relief, means for producing a record in the form of a series of sets of views of a field of view, each view of a set when viewed in the normal manner of viewing photographs showing an aspect of the field of view, each view of each set showing the aspect of the field at a later time than the corresponding view of the preceding set, and each set comprising a large number of views from different points of view respectively, means to project sets of moving picture images corresponding to the sets of views on said record, a parallax panoramagram grating through which the light producing said images passes, and means for viewing said images to give the effect of stereoscopic relief from any one of a plurality of viewing positions within a viewing space corresponding to said different points of view.

7. Apparatus for producing a stereoscopic pictorial record comprising a large number of cameras directed to the same field of view each including means for producing photographic records of said field, means for causing repeated exposures to be made by said cameras at the same rate, and means for causing a plurality of exposures to be made by one of said cameras of the field of view from different points of view.

8. Apparatus for producing a stereoscopic pictorial record comprising a large number of cameras directed to the same field of view, means for causing repeated exposures to be made by said cameras at the same rate, and means for causing a plurality of exposures to be made by each of a plurality of said cameras of the field of view from different points of view.

9. Apparatus for producing a stereoscopic pictorial record comprising a large number of cameras directed to the same field of view, means for causing repeated exposures to be made by said cameras at the same rate, a rotatable refracting medium, and means to cause said medium to assume two positions alternately for producing the effect of relative change of position between said cameras and said field between exposures.

10. Apparatus for producing a stereoscopic pictorial record comprising a large number of cameras directed to the same field of view, means for causing repeated exposures to be made by said cameras at the same rate, a piece of plate glass adapted to rotate, and means to cause said plate to assume two positions alternately for producing the effect of relative change of position between said cameras and said field between exposures.

11. Apparatus for producing a stereoscopic pictorial record comprising a large number of cameras directed to the same field of view, means for causing repeated exposures to be made by said cameras at the same rate, a piece of plate glass located between the field of view and the objectives of a pair of said cameras, and means to move said glass with respect to said objectives between successive exposures of each camera of said pair.

12. Apparatus for producing a stereoscopic pictorial record comprising a large number of cameras directed to the same field of view, means for causing repeated exposures to be made by said cameras at the same rate, a piece of plate glass located between the field of view and the objectives of a pair of said cameras, and means to change the angle between the face of the glass plate and the optical axis of the objective of each camera of the pair between successive exposures of each camera of said pair.

13. Apparatus for producing stereoscopic motion pictures comprising a large number of motion picture projecting machines all directed to the same projecting screen and each including means for projecting a series of pictures on said screen, means for causing said machines to project at the same rate, and means to cause successive projections from one of said machines to produce the effect of relative change of positions between said machine and said screen.

14. Apparatus for producing stereoscopic motion pictures comprising a large number of motion picture projecting machines all directed to the same projecting screen, means for causing said machines to project at the same rate, means to cause successive projections from one of said machines to produce the effect of relative change of positions between said machine and said screen, and means for producing from said images on said screen an image visible in relief, said last mentioned means comprising a parallax panoramagram grating.

15. Apparatus for producing a picture visible in stereoscopic relief, comprising a screen, a plurality of motion picture projectors at least twenty-five in number arranged transversely around said screen and each directed to the same portion of said screen, a grating between said projectors and said screen comprising a large number of alternate transparent and opaque lines, and means utilizing the light rays from said projectors passing through said grating to produce pictures visible in stereoscopic relief.

16. Apparatus for producing a picture visible in stereoscopic relief, comprising a translucent screen, a plurality of motion picture projectors at least twenty-five in number arranged transversely around said screen and each directed to the same portion of said screen, a grating between said projectors and said screen comprising a large number of alternate transparent and opaque lines, and means to photograph the composite image appearing on the back side of said translucent screen.

HERBERT E. IVES.